May 5, 1970  A. MORA  3,510,377
METHOD AND APPARATUS FOR JOINING AN ELASTIC COVER
SHEET TO A CONFIGURED CELLULAR SHEET
Filed Dec. 29, 1965  2 Sheets-Sheet 1

INVENTOR.
ALCIDE MORA
BY
Woodhams, Blanchard & Flynn
ATTORNEYS

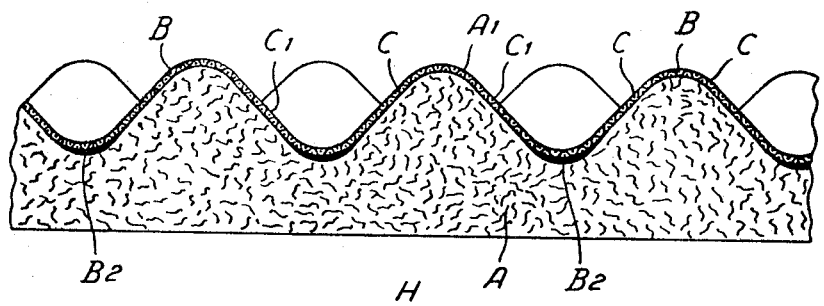
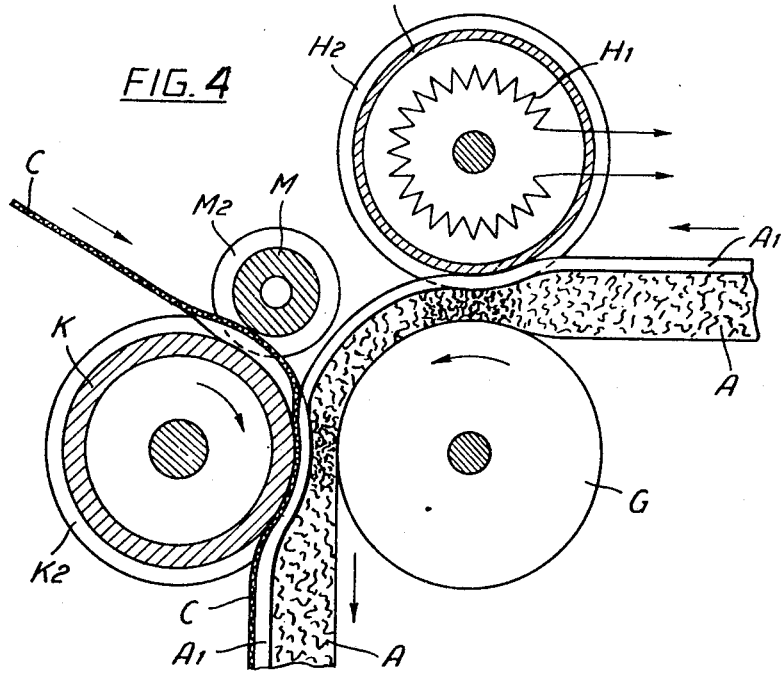
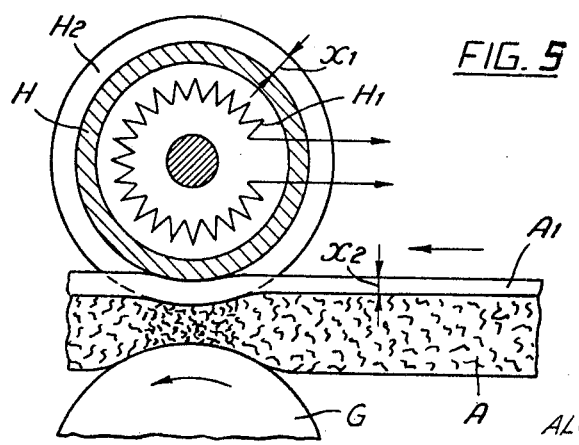

United States Patent Office 3,510,377
Patented May 5, 1970

3,510,377
METHOD AND APPARATUS FOR JOINING AN ELASTIC COVER SHEET TO A CONFIGURED CELLULAR SHEET
Alcide Mora, Varedo, Milan, Italy
Filed Dec. 29, 1965, Ser. No. 517,377
Claims priority, application Italy, Dec. 30, 1964, 27,679/64; Apr. 23, 1965, 9,023/65
Int. Cl. B29c 27/22
U.S. Cl. 156—212                                                13 Claims

ABSTRACT OF THE DISCLOSURE

A process and apparatus for coupling a shaped sheet of elastic cellular material to an elastic covering sheet. The shaped sheet of cellular material is compressed between a pair of rotating rolls. The surface of the shaped face of the cellular sheet is melted when pressed between the pair of rolls, thereby forming an adhesive layer. The covering sheet of elastic material is then applied to the adhesive layer. The cellular sheet and covering sheet are then compressed together to cause the covering sheet to tightly adhere to the cellular sheet.

---

The present invention concerns a process for joining shaped sheets or plates of cellular elastic materials together with suitable covering materials.

Elastic materials of cellular structure are known, generally constituted of expanded resins (polyurethanic, polyester resins and the like) and which find very wide applications; however the use of said materials is not always satisfactory for the required exigencies. For instance for obtaining stuffings or coverings the cellular materials must be provided with a suitable covering, for example of textile material, which forms a resistant surface closing limiting the cells and is also satisfactory from the aesthetical point of view.

Assembling and coupling of the cellular material sheets with fabrics, skins and the like is generally accomplished by means of adhesives or also by thermal process. However said coupling is carried out only by employing cellular sheets with plane surfaces.

Some exigencies require however that one or both faces of the cellular sheet be shaped. In this case the coupling proves to be burdensome and also impossible, especially when the coupling is to be accomplished by thermal action.

The present invention obviates the mentioned inconveniences and allows sheets or plates formed of elastic materials with cellular structure to be obtained one of whose faces is shaped and provided with an adhering covering such as to not limit the elasticity and to retain the shaping after a long use of the material itself, without severing of the covering sheet.

The process according to the invention comprises previously compressing the cellular sheet between two rotating cylinders; applying or forming an adhesive layer on the shaped face of the cellular sheet; applying on said adhesive layer a covering sheet of a substantially elastic material and compressing again said sheets so that the thus obtained composite sheet, after the compression, is free to expand and is not hindered by the covering sheet owing to the elasticity of this latter.

In the case that the covering sheet would be constituted of a fabric, this latter is a knitted fabric; on the contrary in case the covering sheet would be on the base of synthetic materials, as for instance PVC and the like, said covering sheet is subjected to previous heating before being applied and allowed to adhere to the shaped surface of the cellular sheet, in order to allow said shaped surface to resume its original form at the outlet of pressure rolls.

In a suitable embodiment of the herein considered process the sheet of cellular material is made to pass through the pressure cylinders; at least one being heated to a suitable temperature to cause surface melting of the shaped face of said cellular sheet and to said molten surface the covering sheet is applied and made to adhere, said sheet being secured thereon through a further pressure.

To achieve a maximum integrity of the laminate and counter the stress applied to the cover sheet to achieve bonding to the shaped cellular surface, in one embodiment of the invention, by means of a particular roll configuration, hereinafter described, greater pressure is applied to the areas of depression of the cellular surface, causing increased local melting with resulting greater adhesion of the two layers in the areas of depression.

In order to achieve in correspondence with the more stressed zones an assembling secure from all the points of view, the shaped cellular sheet is subjected to a differentiated surface pressure apt to effect, in correspondence with said more stressed zones, an intensive and heightened melting in order that the covering sheet adheres more perfectly.

The present invention concerns also the equipment for carrying out the just considered process; said equipment being characterized by at least two pairs of rolls, each one of which involves a shaped cylinder, one of which is provided with heating means for melting the surface of the cellular sheet and for allowing the covering sheet to adhere with uniformity and continuity to the shaped and molten surface of the cellular sheet.

The invention will now be explained by the following description with reference to the attached drawing, wherein:

FIG. 3 is the section of an alternative of the composite sheet.

FIGS. 4 and 5 are schematic cross sections of two embodiments of the equipment for obtaining the composite sheet according to FIG. 3.

Figure 1:
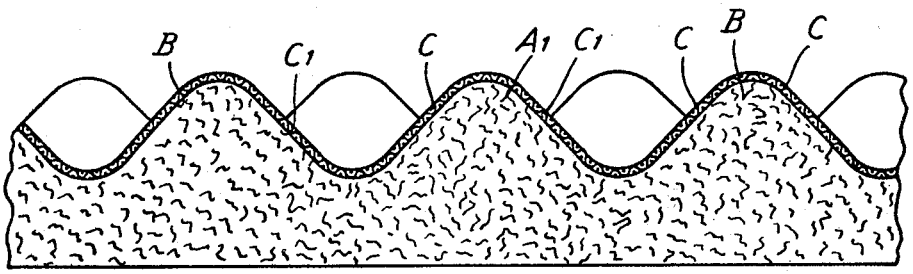
FIG. 1 shows by way of example and in section a composite sheet made by the process of the present invention.
Figure 2:
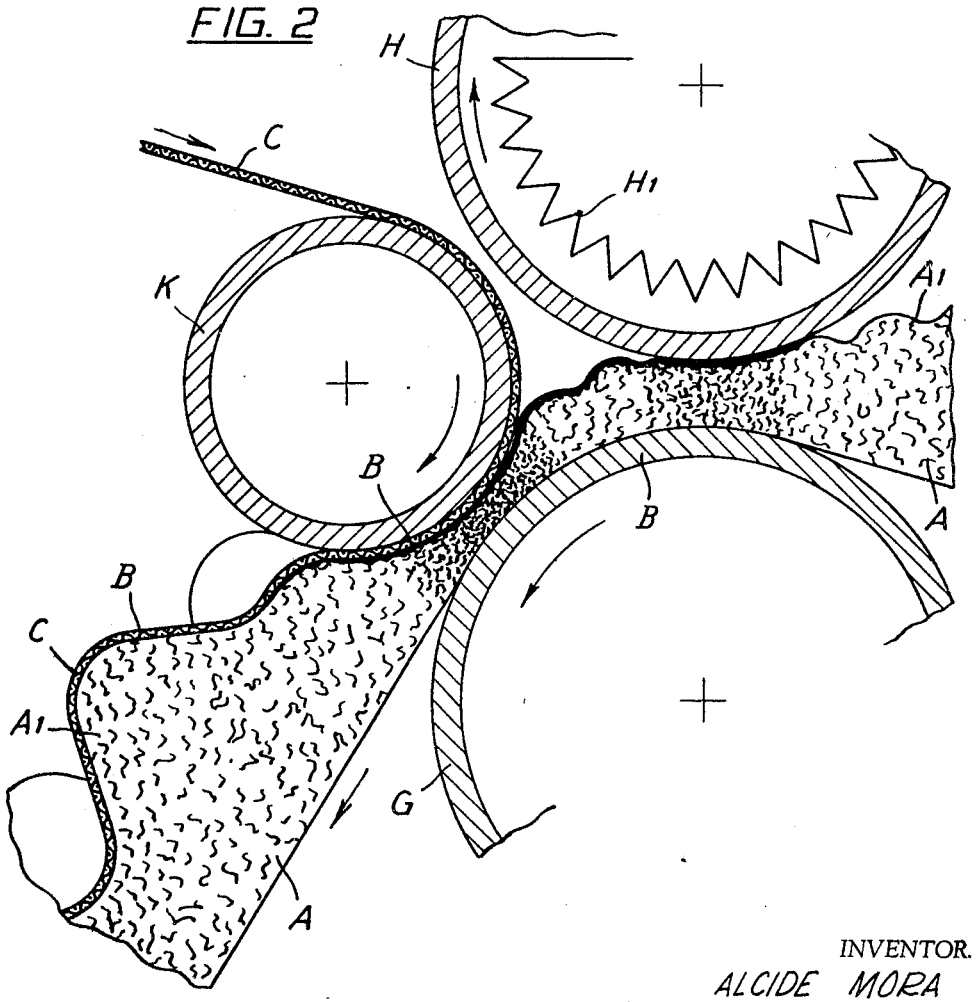
FIG. 2 illustrates schematically in cross section the equipment for achieving the shaped composite sheet.

With reference to FIGS. 1 and 2, A indicates the sheet of cellular elastic material, made up for instance of expanded polyester resins and/or polyurethanes. One or both faces of said sheet are suitably shaped in accordance with the requirements to be satisfied; in the illustrated case the face $A_1$ of said sheet has a plurality of projections thereon. Said shaped face $A_1$ is then provided with a suitable adhesive layer B which holds with continuity and indissolubly a covering sheet C, for example of textile material.

The union of both sheets A and C may be obtained by means of a suitable adhesive or also by surface melting of the shaped face $A_1$ of the cellular sheet A.

With reference to FIG. 2, the bonding process will now be described, which proves to be simple and practical of execution.

The shaped cellular sheet A is allowed to pass through a pair of rolls G and H, the last having thermal means $H_1$ heating it to a suitable temperature capable of melting the surface of the shaped face $A_1$ of said cellular sheet. A layer B of adhesive material is thus formed, of practically uniform thickness; this condition is achieved automatically and readily, since it suffices to control only, in addition to the roll H temperature, also the pressure and the forwarding rate of the cellular sheet A between the rolls G–H for securing the melting of surface $A_1$ for some depth.

At the outlet of the pair of rolls G–H, the cellular sheet A undergoes a limited expansion which is suitably controlled so as to distribute and diffuse with uniformity the adhesive layer B and to allow said layer to penetrate (especially during the further compression) the surface cells of the shaped face $A_1$ and to thus close said cells adjacent the surface of the sheet, whereafter the cellular sheet A, always under a state of precompression, is allowed to pass through a further pair of rolls, one of which is the same roll G, whereas the other K constitutes the forwarding roll for the covering sheet C.

The sheet C is pressed and made to adhere against the adhesive face B and is furthermore compressed against and conjointly to the cellular sheet A.

At the outlet from rolls G–K a composite sheet A–C is obtained whose surface $A_1$ is substantially shaped as originally, the covering sheet C adheres continuously to the shaped face $A_1$ and said condition is secured without impairing the union of both sheets and the characteristics of the shaped face $A_1$, since the covering sheet C displays some elasticity allowing the expansion of the shaped surface $A_1$.

With reference to FIG. 1 (while bearing in mind that to the shaped face A an elastic fabric is preferably applied, as a knitted fabric and another similar fabric capable of stretching in all the directions when the composite sheet A–C is free), the covering sheet C has zones $C_1$ wherein the fabric is more stretched than in other places according to the expansion of the shaped face $A_1$ of the cellular sheet A.

Where other materials are employed, having limited elasticity, as for instance sheets of resins or of artificial or synthetic materials as polyvinyl chloride and the like, said sheets are able to satisfy the requirements of stretching by subjecting them, before the bonding, to a previous heating; in the case of FIG. 2, said heating may be applied to the sheet C by means of a thermal source arranged in correspondence with the roll K inlet.

In the alternative according to FIG. 3, the parts like those of FIG. 1, are distinguished by the same reference marks.

When considering now FIG. 4, one of the faces of the sheet of cellular material A is previously shaped in a suitable way, for instance by means of cutting tools.

The shaped sheet A is then introduced between a first pair of rolls G and H, the first of which is provided with heating means $H_1$ and its periphery with a portion $H_2$ of greater diameter than the remainder of the roll H, same corresponding to the profile $A_1$ of the cellular sheet A.

Said sheet upon leaving said rolls is allowed to pass between two further rolls G and K, the last being provided on its periphery with a profile $K_2$ like the profile $H_2$ of the previously considered roll H. Roll K is combined with a counter-roll M whose periphery $M_2$ is so shaped as to couple with the periphery $K_2$ of the roll K and between these two rolls K and M the covering sheet C is allowed to pass, to be subsequently contacted with and pressed against the cellular sheet A by both rolls G and K. As a result the covering sheet C is made to adhere uniformly and continuously to the profile $A_1$ of the cellular sheet A and compressed thereon so as to secure the junction between these two sheets.

In order to secure a greater adhesion of the covering sheet in correspondence with the more stressed zones, as for instance the zones $B_2$ of FIG. 3 (that is the zones arranged in correspondence with the more raised part or top of the profile $H_2$) a differentiated melting is carried out on the shaped face $A_1$; namely in correspondence with said zone $B_2$ the cellular material is subjected to a greater melting. This result is attained by means of the equipment illustrated in FIG. 5, wherein the roll H has a shaped portion $H_2$ whose radial depth $X_1$ is greater than the depth $X_2$ exhibited by the shaped surface $A_1$ of the cellular sheet. Consequently when the sheet A passes through the rolls G and H it undergoes a greater compression in correspondence with the periphery of the shaped zone $H_2$; said zone melts thus a greater extent than in correspondence with the bottom of said shaped zone $H_2$. Consequently the covering sheet C will adhere more intensely in correspondence with the above considered zone $B_2$, whereby the junction of both sheets is wholly secured in the more lowered zone of the profile where the stress of the cellular material A is more displayed on the covering sheet C.

Where the shaping $A_1$ of the cellular sheet A is of restricted depth and of a simple profile, said shaping will be carried out simultaneously with the surface melting with help of the roll H, thus simplifying the coupling operation. Moreover it is possible in this case to obtain automatically the adhesive thickening in correspondence with the zone of greater depth $B_2$ of the cellular sheet whereby the coupling is remarkably promoted and perfect adhesion of the covering sheet C is secured without impairing the softness and the transpiration properties of said sheet.

In this case the smooth roll G could involve the heating means. The cellular sheet A is introduced between rolls G–H so as its face shaped or to be shaped will be turned toward the hot surface of said roll G to thus achieve structural simplification of the equipment.

The coupling of the sheets of cellular material A may be attained with covering sheets C of whatever material, even if limitedly elastic and extensible, the cellular structure of the obtained composite sheet remaining practically unchanged, whereby the wanted proportion of permeability of the obtained composite product is secured.

Further modifications and variations may be applied either to the just disclosed process or also to the equipment operating said process. Of course the present invention involves also the composite material made up of a carrier of cellular material provided on at least one of its faces with a covering sheet having the wanted characteristics.

I claim:

1. A process for coupling an elastically stretchable initially unshaped covering sheet with a sheet of heat sealable, elastically deformable cellular material shaped such that at least one surface thereof is nonplanar, said process comprising the steps of shaping said cellular sheet to form a nonplanar shaped configuration on one face thereof, continuously moving said sheet of cellular material in a feed direction so as to pass said cellular sheet between a pair of rolls, one of said rolls being heated, said nonplanar shaped face being directly contacted by said heated roll, compressing the sheet of cellular material as same passes between said pair of rotating rolls, melting the surface of the nonplanar shaped face of the cellular sheet when said cellular sheet is pressed between said pair of rolls due to said heated roll directly contacting said shaped face so as to form on said shaped face an adhesive layer which is substantially continuous throughout the feed direction of said cellular sheet, applying said initially unshaped covering sheet to said adhesive layer on said shaped face after said cellular sheet has passed through the pair of rolls, compressing together said cellular and covering sheets to cause said covering sheet to conform to and tightly adhere to the shaped surface of said cellular sheet, and permitting the resultant composite sheet when relieved of the compression to freely expand as permitted by the elasticity of the covering sheet.

2. A process according to claim 1, wherein said cellular sheet is of an expanded plastic material.

3. A process according to claim 1, wherein said covering sheet is of an elastic knitted fabric.

4. A process according to claim 1, wherein the covering sheet is at least partially of thermoplastic material, said covering sheet being heated before being applied to the shaped face of the cellular sheet to render said covering sheet elastically deformable.

5. A process according to claim 1, wherein the face of said cellular sheet is shaped to a nonplanar configuration simultaneously with the melting of the surface thereof between said pair of rotating rolls.

6. A process according to claim 1, wherein said pair of rolls have rotational axes which define a plane substantially transverse to said sheet of cellular material at it passes between said rolls, and the nonplanar face of said cellular sheet having a nonplanar profile within said transverse plane.

7. A process according to claim 1, further including the step of permitting said sheet of cellular material, after passing between said pair of rolls and prior to application of said covering sheet, to at least partially expand for causing a more uniform distribution of said adhesive layer, said covering sheet then being applied to said adhesive layer.

8. A process according to claim 7, wherein the nonplanar shaped face of said cellular sheet has a nonlinear profile which lies in a plane containing at least one of the rotational axes of said pair of rolls, said plane being substantially transverse to the feed direction of said sheet of cellular material.

9. A process for coupling an elastically stretchable covering sheet with a sheet of heat sealable, elastically deformable cellular material shaped such that at least one surface thereof is nonplanar, said process comprising the steps of shaping said cellular sheet to form a nonplanar configuration on one face thereof, then compressing the sheet of cellular material between a pair of rotating rolls with said rolls applying a greater pressure in some areas than is applied to immediately adjacent areas to the surface of the shaped face of the cellular sheet, melting the surface of the shaped face of the cellular sheet when said cellular sheet is pressed between said pair of rolls to form an adhesive layer, the pressure differences applied to said surface of said cellular sheet resulting in nonuniform melting of said surface of said nonplanar shaped face to obtain surface zones wherein greater amounts of material are melted in order to achieve in said zones a greater adhesive action, applying said covering sheet to said adhesive layer after said cellular sheet has been passed through the pair of rolls, compressing together said cellular and covering sheets to cause said covering sheet to tightly adhere to said cellular sheet, and permitting the resulting composite sheet when relieved of the compression to freely expand as permitted by the elasticity of the covering sheet.

10. An apparatus for coupling an elastically stretchable covering sheet to a shaped sheet of elastically deformable cellular material having at least one shaped nonplanar face, said apparatus comprising a first pair of spaced rotating rolls arranged to permit said sheet of cellular material to pass therebetween, one of the rolls of said first pair having a profile on the face thereof substantially corresponding to the profile of the shaped face, heating means associated with said first pair of rolls for melting the surface of the shaped face, a second pair of rotating rolls spaced downstream of said first pair of rolls with said second pair of rolls being spaced apart to permit said sheet of cellular material to pass therethrough, said covering sheet being applied to the melted surface of said cellular sheet at a position between said first and second pair of rolls, one of said rolls of said second pair having a profile formed on the surface thereof substantially corresponding to the profile of the shaped face of the cellular sheet whereby passage of said cellular sheet and said covering sheet between said second pair of rolls causes said covering sheet to be tightly pressed against said cellular sheet, and the profile of said one roll of said first pair having a radial depth which is greater than the depth of the profile on the shaped face of said cellular sheet whereby passage of said cellular sheet between said first pair of rolls causes compression of the cellular sheet at least in the regions thereof of greater depth of the profile so as to cause increased melting of the surface in these regions.

11. An apparatus according to claim 10, wherein said heating means is positioned within said one roll of said first pair.

12. An apparatus according to claim 10, wherein the other roll of said first and second pairs of rolls comprises a single roll.

13. An apparatus according to claim 10, further including a counter roll positioned adjacent said one roll of said second pair whereby said covering sheet is fed between said one roll of said second pair and said counter roll into engagement with the melted surface of said cellular sheet, said counter roll also having a profile formed on the surface thereof for conveying and shaping said covering sheet as it is fed between the rolls of said second pair into contact with the melted surface of said cellular sheet.

References Cited
UNITED STATES PATENTS

| | | | |
|---|---|---|---|
| 2,543,101 | 2/1951 | Francis | 156—62.2 |
| 3,257,263 | 6/1966 | Miller | 156—209 |
| 2,718,484 | 9/1955 | Baroumes | 156—214 |
| 2,752,279 | 6/1956 | Alderfer | 156—220 X |
| 3,028,279 | 4/1962 | Heberlein | 156—229 X |
| 3,104,192 | 9/1963 | Hacklander | 156—219 X |
| 3,249,984 | 5/1966 | Storti | 156—229 X |
| 3,294,387 | 12/1966 | Chavannes | 161—119 X |

FOREIGN PATENTS

| | | |
|---|---|---|
| 215,406 | 6/1958 | Australia. |
| 569,965 | 5/1954 | Canada. |
| 622,028 | 6/1961 | Canada. |
| 916,287 | 1/1963 | Great Britain. |

JOHN T. GOOLKASIAN, Primary Examiner

W. E. HOAG, Assistant Examiner

U.S. Cl. X.R.

156—468